Feb. 20, 1962 C. J. WHITTIER 3,021,622
TRACTOR MOUNTED DITCHERS
Filed July 24, 1961 2 Sheets-Sheet 1
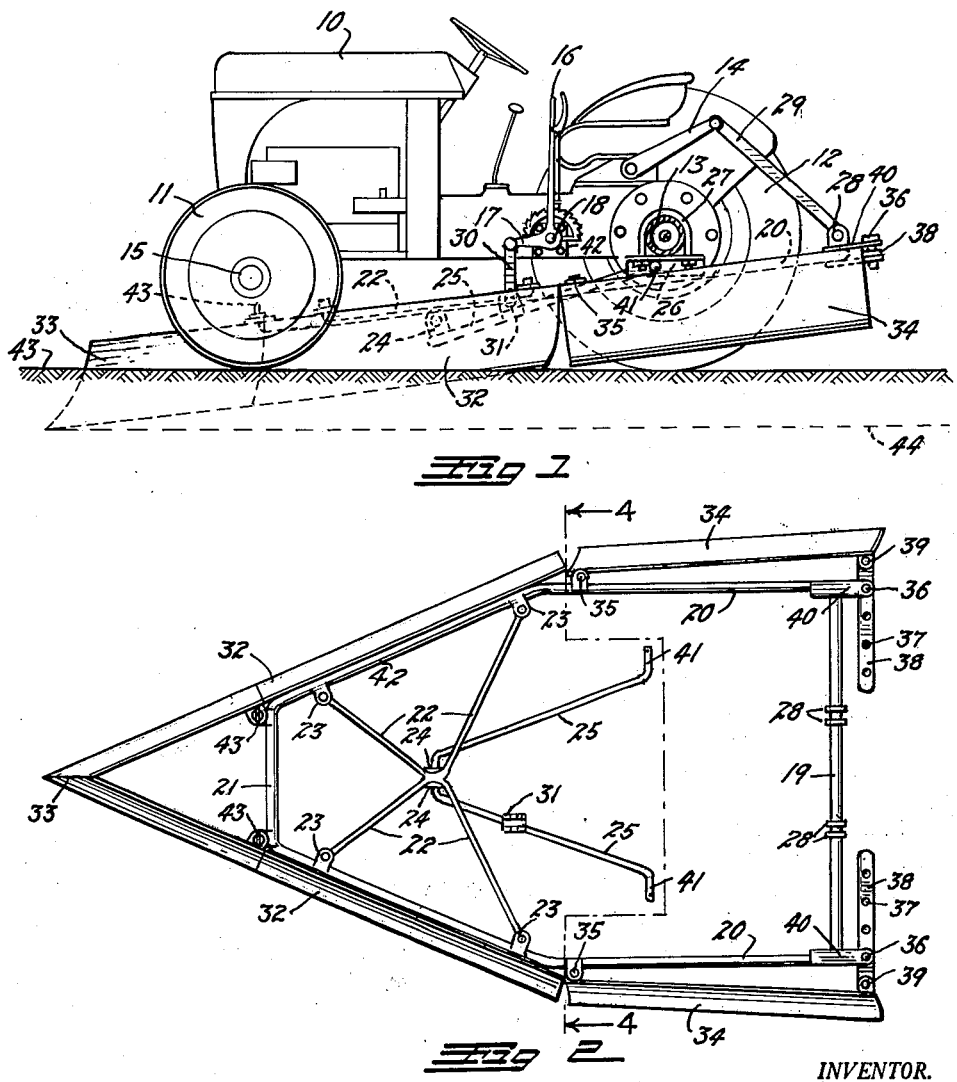
INVENTOR.
CLYDE J. WHITTIER
BY
ATTORNEY Feb. 20, 1962 C. J. WHITTIER 3,021,622
TRACTOR MOUNTED DITCHERS
Filed July 24, 1961 2 Sheets-Sheet 2

INVENTOR.
CLYDE J. WHITTIER
BY
ATTORNEY

United States Patent Office 3,021,622
Patented Feb. 20, 1962

3,021,622
TRACTOR MOUNTED DITCHERS
Clyde J. Whittier, Center, Colo., assignor of one-half to E. B. Meadows, Monte Vista, Colo.
Filed July 24, 1961, Ser. No. 126,196
5 Claims. (Cl. 37—98)

This invention relates to a ditch forming attachment for tractors and has for its principal object the provision of a simple, relatively lightweight attachment which can be quickly and easily attached to or detached from a conventional farm tractor for forming, cleaning and renovating field irrigation ditches.

Another object of the invention is to provide a ditcher of the above type which will require no changes of any kind in the tractor and which will be under the constant control of the tractor driver to plow a ditch of any desired depth and width.

A further object is to so construct the attachment that the plowing reaction of the ditcher will be transmitted directly to the drive axle housing of the tractor so as to relieve all strains and stresses on the tractor or tractor chassis.

Other objects and advantages reside in the detail construction of the invention, which is designed for simplicity, economy and efficiency. These will become more apparent from the following description.

In the following detailed description of the invention, reference is had to the accompanying drawing which forms a part hereof. Like numerals refer to like parts in all views of the drawing and throughout the description.

In the drawing:

FIG. 1 is a side elevational view of a conventional field tractor with the invention mounted thereon;

FIG. 2 is a detail top view of the ditch-forming attachment removed from the tractor;

Figure 3:
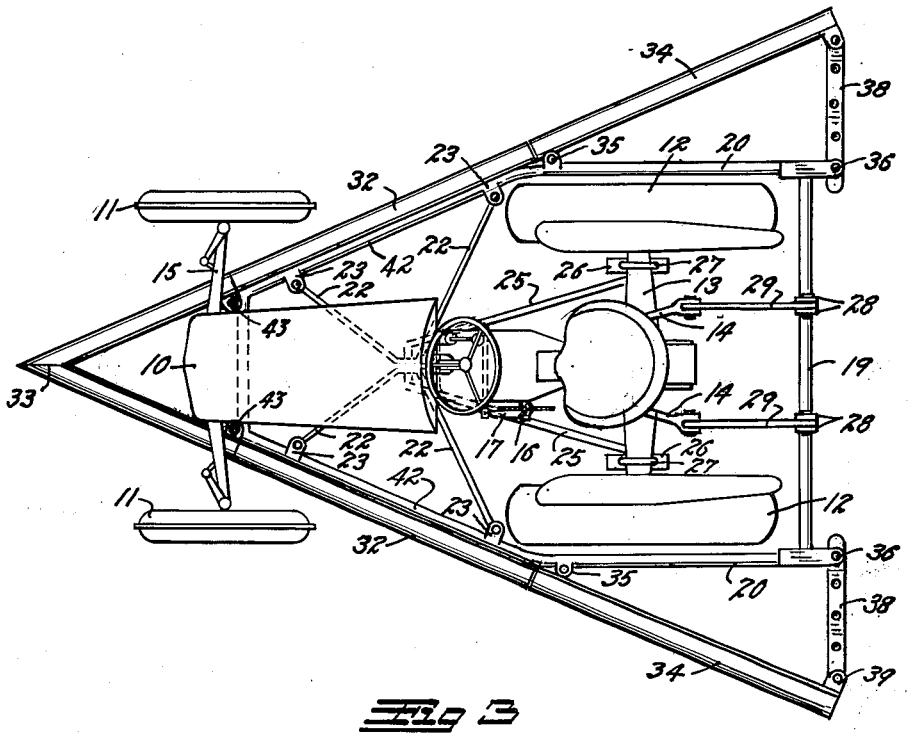
FIG. 3 is a top plan view of the tractor with the improved ditch-forming attachment in place thereon.
Figure 4:
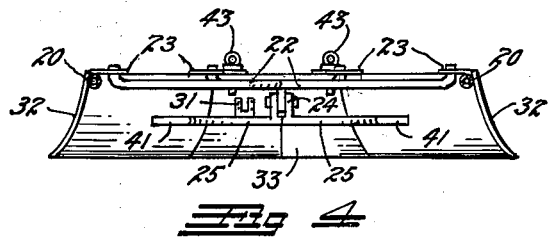
FIG. 4 is a cross section through the attachment, taken on the line 4—4, FIG. 2.

In the drawing a conventional farm tractor is illustrated at 10 with its front guide wheels at 11, rear traction wheels at 12, rear axle housing at 13, hydraulically-operated implement lift arms at 14, and front axle at 15. For the purposes of this invention, a conventional ratchet-locked hand lever 16 is pivotally mounted, as shown at 18, on the tractor substantially midway between the front wheels 11 and the rear wheels 12 and within convenient reach of the driver. A lift lever 17 extends forwardly from the hand lever 16 so as to move upwardly and downwardly as the hand lever 16 is swung rearwardly and forwardly. The entire weight of the ditch-forming attachment is supported from the lift lever 17 and the implement lift arms 14.

The improved ditch-forming attachment employs a flat, horizontal, open, unitary pipe frame consisting of an endless pipe bent to form a transverse front portion 21, a rear portion 19 and two parallel side portions 20 extending forwardly from the extremities of the rear portion 19, and joining the rear extremities of two inwardly angled apex portions 42 which join the extremities of the transverse front portion 21. The rear portion 19 is made long enough to separate the side portions 20 sufficiently to position them outwardly beyond the rear wheels 12. The side portions 20 and the apex portions 42 are sufficiently long to position the front portion 21 immediately behind the middle of the front axle 15.

A brace member 22 extends inwardly from each of the angled apex portions 42. The brace members 22 each consist of relatively heavy round shafts or rods bent in an L-shape with their extremities mounted in attachment pads 23 welded to the angled apex portions 42. The bends or apexes of the L-shaped rods are welded or otherwise fixedly joined together at the longitudinal axis of the pipe frame and two spaced-apart attachment ears 24 arise from the mutual joint.

A substantially horizontal and substantially V-shaped pushing member 25 is hingedly mounted at its apex or bend to the attachment ears 24 and the two extremities of the pushing member extend rearwardly thence outwardly, as shown at 41, to a detachable attachment with the rear axle housing 13. As illustrated, the rearwardly extending extremities of the pushing member 25 are hingedly mounted in angle iron clamping members 26 which are clamped beneath the rear axle housing by means of U-bolts 27. Thus, as the tractor moves forwardly, the entire pipe frame is pushed forwardly from the rear axle housing.

The rear portion 19 of the pipe frame is provided with two sets of spaced attachment ears 28 by means of which the rear of the pipe frame is suspended from the implement lift arms 14 of the tractor through the medium of suspension links 29. The forward portion of the pipe frame is suspended from the lift lever 17 of the hand lever 16 through the medium of a third suspension link 30 hingedly attached to the pushing member 25, as indicated at 31. Thus, forward and back movements of the hand lever will result in tilting the front of the pipe frame downwardly and upwardly and upward and downward movements of the implement lift levers will result in tilting the rear of the pipe frame upwardly and downwardly.

A scraper-shaped, fixed mold board 32 is welded adjacent its upper edge to each of the angled apex portions 42 and a removable V-shaped pointed plow 33 of a conventional snow-plow shape is secured at each of its rear extremities to the forward extremities of the mold boards 32 by means of a vertical, withdrawable anchoring pin 43. An adjustable mold board 34 is hinged on a vertical pivot member 35 on the pipe frame rearwardly of each of the fixed mold boards 32 so that it may swing from a position in alignment with the fixed mold board to a position parallel to and alongside one of the side pipe portions 20. The adjustable mold boards 34 can be set at any desired extended positions by means of adjusting pins 36 which can be placed in any of a plurality of spaced pin openings 37 in brace bars 38. The brace bars 38 are hinged, as shown at 39, upon the rear extremities of the adjustable mold boards 34 and extend between pairs of pin ears 40 welded to and projecting rearwardly from the extremities of the rear pipe portion 19 to receive the pins 36.

It is believed that the use of the invention will be apparent from the above description of the elements thereof. Briefly, the tractor is positioned over a present ditch or over the center line of a proposed ditch. The hand lever 16 is then swung forwardly to lower the point of the plow 33 into the ground to the desired depth. The hydraulic lift levers are actuated to adjust the slant of the mold boards to produce a ditch of the desired width. The adjustable mold boards 34 are set to sweep the earth from the sides of the ditch.

In exceedingly large ditches, the tractor wheels will travel along the inclined sides of the ditch and the adjustable mold boards will sweep the earth away to a plane above the plane upon which the tractor is traveling. For road traveling the plow-anchoring pins 43 are withdrawn and the plow 33 is removed. The hand lever 16 and the lift arms 14 are operated to lift the mold boards from the ground and the adjustable mold boards 34 are swung inwardly to reduce the overall width. With the plow 33 removed, the pipe frame and the mold boards 32 can be raised to a horizontal position rearward of the front axle 15 so as to clear the ground and the banks of the ditch.

The plow 33 can also be removed when working in a flat-bottomed ditch so that the mold boards 32 can contact the ditch banks to their juncture with the flat bottom.

While a specific form of the improvement has been described and illustrated herein, it is to be understood that the same may be varied within the scope of the appended claims, without departing from the spirit of the invention.

Having thus described the invention what is claimed and desired to be secured by Letters Patent is:

1. A ditch-forming attachment for a tractor having front and rear wheels, a rear axle housing and implement lift arms comprising: a U-shaped pushing member hingedly mounted at its extremities on said rear axle housing and extending forwardly therefrom in a substantially horizontal plane; a flat, angle-sided open frame hingedly and medially attached to the forward extremity of said pushing member beneath said tractor and extending forwardly therefrom; a mold board secured to each angled side of said frame and terminating in a pointed plow; adjustable supporting means between said tractor and said pushing member for raising and lowering the forward extremity of said frame; and suspension means between said implement lift levers and the rear extremity of said frame for raising and lowering the latter.

2. A ditch-forming attachment for tractors as described in claim 1 in which the hinged and medially mounted attachment between said pushing member and said open frame comprises two L-shaped brace members, there being one of said brace members attached at its extremities to each angle side of said frame, the apexes of said brace members being fixedly secured together and hinged to said pushing member medially below said tractor.

3. A ditch-forming attachment for tractors as described in claim 2 in which said open frame extends outwardly at the rear beyond said rear wheels and inwardly at the front between said front wheels.

4. A ditch-forming attachment for tractors as described in claim 3 in which the portion of the frame extending outwardly and rearwardly beyond said rear wheels are straight and parallel and having an adjustable mold board pivoted on a vertical axis at the forward extremity of each straight and parallel portion so that they may swing inwardly parallel to said straight portions or outwardly into alignment with said fixed mold boards and means for holding said adjustable mold boards at any desired extended angle.

5. A ditch-forming attachment for tractors as described in claim 1 having means for detachably securing said plow point forwardly of said mold boards.

References Cited in the file of this patent

UNITED STATES PATENTS

| 2,856,709 | Brockly | Oct. 21, 1958 |

FOREIGN PATENTS

| 165,129 | Australia | of 1955 |
| 528,720 | Italy | of 1955 |